(12) United States Patent
Tajiri (10) Patent No.: US 11,023,999 B2
(45) Date of Patent: Jun. 1, 2021

(54) IMAGE PROCESSING APPARATUS, INFORMATION PROCESSING SYSTEM, INFORMATION PROCESSING METHOD, AND STORAGE MEDIUM

(71) Applicant: CANON KABUSHIKI KAISHA, Tokyo (JP)

(72) Inventor: Katsutoshi Tajiri, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 89 days.

(21) Appl. No.: 16/114,719

(22) Filed: Aug. 28, 2018

(65) Prior Publication Data
US 2019/0066259 A1 Feb. 28, 2019

(30) Foreign Application Priority Data
Aug. 31, 2017 (JP) .............................. JP2017-166983

(51) Int. Cl.
*G06T 3/00* (2006.01)
*H04N 5/232* (2006.01)
*G06T 3/40* (2006.01)

(52) U.S. Cl.
CPC .......... *G06T 3/0062* (2013.01); *G06T 3/0018* (2013.01); *G06T 3/4038* (2013.01); *H04N 5/23229* (2013.01); *H04N 5/23238* (2013.01); *G06T 2207/20221* (2013.01)

(58) Field of Classification Search
CPC ... G06T 3/0062; G06T 3/0018; G06T 3/4038; G06T 2207/20221; H04N 5/23229; H04N 5/23238
USPC .................................................. 382/276, 293
See application file for complete search history.

(56) References Cited

U.S. PATENT DOCUMENTS

| 9,589,350 | B1   |   | 3/2017 | Kozko        |            |
|-----------|------|---|--------|--------------|------------|
| 2004/0008423 | A1 | * | 1/2004 | Driscoll, Jr. | G02B 13/06 |
|           |      |   |        |              | 359/725    |
| 2005/0151837 | A1 | * | 7/2005 | Cutler       | G06T 3/0062|
|           |      |   |        |              | 348/36     |
| 2010/0053325 | A1 | * | 3/2010 | Inagaki      | G06T 3/0062|
|           |      |   |        |              | 348/143    |
| 2011/0211040 | A1 | * | 9/2011 | Lindemann    | G01S 19/14 |
|           |      |   |        |              | 348/36     |
| 2012/0162357 | A1 | * | 6/2012 | Okegawa      | G06T 3/0025|
|           |      |   |        |              | 348/36     |
| 2013/0057546 | A1 | * | 3/2013 | Watanabe     | G06T 3/4038|
|           |      |   |        |              | 345/419    |

(Continued)

FOREIGN PATENT DOCUMENTS

| CN | 1837952 A | 9/2006 |
|----|-----------|--------|
| CN | 101852980 A | 10/2010 |

(Continued)

*Primary Examiner* — Geoffrey E Summers
(74) *Attorney, Agent, or Firm* — Canon U.S.A., Inc. IP Division (57) ABSTRACT

An image processing apparatus includes an obtaining unit configured to obtain a setting value for identifying an end line corresponding to (i) at least a part of a fisheye image and (ii) an end in a panoramic image serving as an image on which distortion correction processing has been performed, and a generating unit configured to generate a plurality of panoramic images in which division lines are harmonized with each other from the fisheye image on a basis of the setting value.

8 Claims, 9 Drawing Sheets

(56) References Cited

U.S. PATENT DOCUMENTS

| | | | |
|---|---|---|---|
| 2015/0016746 A1* | 1/2015 | Tsubota | G06T 3/00 |
| | | | 382/275 |
| 2015/0070523 A1 | 3/2015 | Chao | |
| 2015/0172620 A1 | 6/2015 | Guo | |
| 2016/0277679 A1* | 9/2016 | Kimura | H04N 5/23238 |
| 2016/0292884 A1* | 10/2016 | Schnittman | G06K 9/00255 |

FOREIGN PATENT DOCUMENTS

| | | |
|---|---|---|
| CN | 102572240 A | 7/2012 |
| CN | 103339927 A | 10/2013 |
| CN | 105516569 A | 4/2016 |
| EP | 2940988 A1 | 11/2015 |
| JP | 2013-218432 A | 10/2013 |
| JP | 2015-46949 A | 3/2015 |

* cited by examiner

IMAGE PROCESSING APPARATUS, INFORMATION PROCESSING SYSTEM, INFORMATION PROCESSING METHOD, AND STORAGE MEDIUM

BACKGROUND OF THE INVENTION

Field of the Invention

The present invention relates to an image processing apparatus, an information processing system, an information processing method, and a storage medium.

Description of the Related Art

Up to now, a camera that captures all directions has been proposed, and it is possible to create an omnidirectional image in which a 360 degree surrounding of a device is captured or obtain a panoramic image by correcting a distortion of the omnidirectional image. Examples of the panoramic image include a one-screen panoramic image obtained by converting an omnidirectional 360-degree image into a single planar image, a two-screen panoramic image obtained by dividing the omnidirectional 360-degree image into two 180-degree images for subsequent conversion into planar images, a four-screen panoramic image obtained by dividing the omnidirectional 360-degree image into four 90-degree images for subsequent conversion into planar images, and the like. It is also possible to perform image distribution or image accumulation together with the omnidirectional image.

For example, Japanese Patent Laid-Open No. 2015-46949 describes a method of switching from the omnidirectional image to the one-screen panoramic image or the two-screen panoramic image in accordance with a panel operation amount from a panel interface.

The two-screen panoramic image or the four-screen panoramic image is an image obtained by dividing the omnidirectional 360-degree image into a plurality of areas, correcting distortions of the divided areas, and vertically combining the areas to each other or vertically and horizontally combining the areas to one another. According to a related-art technology, areas between a plurality of panoramic images generated from a fisheye image are not automatically harmonized (e.g. matched) with each other.

SUMMARY OF THE INVENTION

An image processing apparatus according to an aspect of the present invention includes an obtaining unit configured to obtain a setting value for identifying an end line corresponding to (i) at least a part of a fisheye image and (ii) an end in a panoramic image serving as an image on which distortion correction processing has been performed, and a generating unit configured to generate a plurality of panoramic images in which division lines are harmonized with each other from the fisheye image on a basis of the setting value.

Further aspects, features and advantages of the present invention will become apparent from the following description of exemplary embodiments with reference to the attached drawings. It should be understood that any of the features described herein in relation to a particular embodiment or set of embodiments may be combined with the features of one or more other embodiments without any limitations other than those imparted by the broadest aspects of the invention as defined hereinabove. In particular, features from different embodiments can be combined where necessary or where the combination of elements or features from individual embodiments in a single embodiment is beneficial.

DESCRIPTION OF THE EMBODIMENTS

Hereinafter, exemplary embodiments of the present invention will be described with reference to the drawings.

According to the following exemplary embodiments, an omnidirectional image is a 360-degree circular image as viewed from a ceiling or the like. It is supposed that an outer circumference of a circle represents the ceiling, and a center of the circle represents a floor. The omnidirectional image does not mean only an image in which all of surrounding objects are captured, and the scope of the omnidirectional image includes an image captured by a lens such as a fisheye lens involving a distortion at least larger than that of a normal lens. In addition, according to the respective exemplary embodiments, a panoramic image is an image corresponding to at least a part of a fisheye image and also an image on which distortion correction processing is performed. According to the respective exemplary embodiments, the above-described image is referred to as the panoramic image, but various other names may also be used. Further, in the following exemplary embodiments, "harmonization" means keeping condition that something is same as other things.

First Exemplary Embodiment

Figure 1:
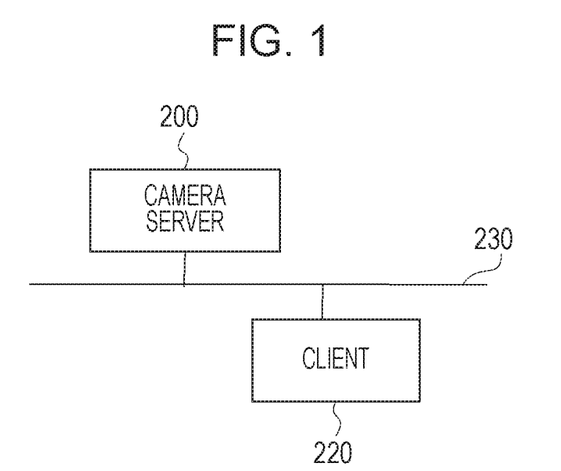
FIG. 1 illustrates an example of a system configuration of an information processing system.

FIG. 1 illustrates an example of a system configuration of an information processing system.

In the information processing system, a camera server 200 and a client 220 are connected with each other via a network 230. The camera server 200 is an example of an image processing apparatus.

The camera server 200 is provided with a camera and distributes a captured image via the network 230. The client 220 accesses the camera server 200 and obtains the image.

To simplify the descriptions, only the single camera server is arranged, but two or more camera servers may be used. In addition, another client that accesses the camera server 200 and performs reception or accumulation of the image may be used other than the client 220.

The network 230 is constituted by a plurality of: routers that satisfy a communication standard such as Ethernet (registered trademark); switches, cables; and the like. Any communication standard, scale, and configuration of the network 230 may be adopted as long as respective communications between the servers and clients can be performed without any problem. Therefore, the internet, a local area network (LAN), and the like can be applied as the network 230.

Figure 2:
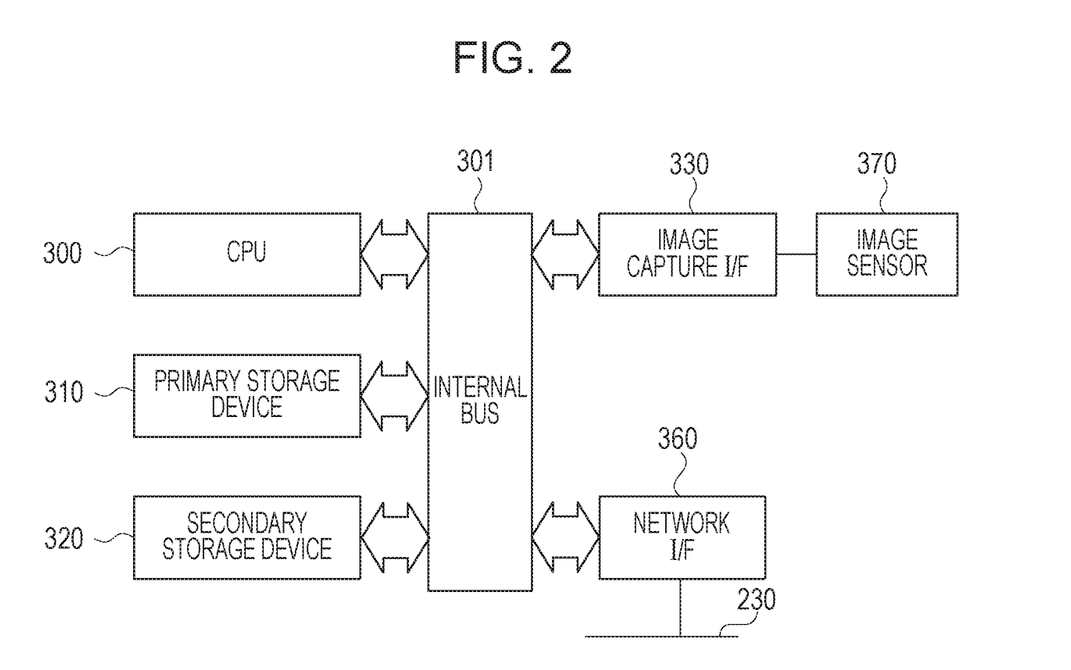
FIG. 2 illustrates an example of a hardware configuration of a camera server.

FIG. 2 illustrates an example of a hardware configuration of the camera server 200.

The camera server 200 includes a CPU 300, a primary storage device 310, a secondary storage device 320, an image capture interface (I/F) 330, and a network I/F 360 as the hardware configuration. The respective hardware components are connected to one another via an internal bus 301.

The primary storage device 310 is a writable storage device represented as a random access memory (RAM). An operating system (OS), various programs, and various data are loaded onto the primary storage device 310. The primary storage device 310 can also be used as a work area for the OS and the various programs.

The secondary storage device 320 is a non-volatile storage device represented by a flash memory, a hard disc drive (HDD), an SD card, and the like. The secondary storage device 320 is used as a permanent storage area for the OS, the various programs, and the various data and is also used as a storage area for various short-term data.

An image sensor 370 consisted by a charge-coupled device (CCD) or a complementary metal-oxide semiconductor (CMOS) is connected to the image capture I/F 330. The image capture I/F 330 converts image data obtained from the image sensor 370 into a predetermined format to be compressed and transferred to the primary storage device 310.

The network I/F 360 is an I/F for establishing a connection to the network 230 and plays a role for performing a communication with the client 220 or the like via a communication medium such as Ethernet.

When the CPU 300 executes processing on the basis of the OS or the program stored in the secondary storage device 320, a software configuration of FIG. 5 which will be described below and processing of a flow chart of FIG. 6 which will be also described below are realized.

Figure 3A:
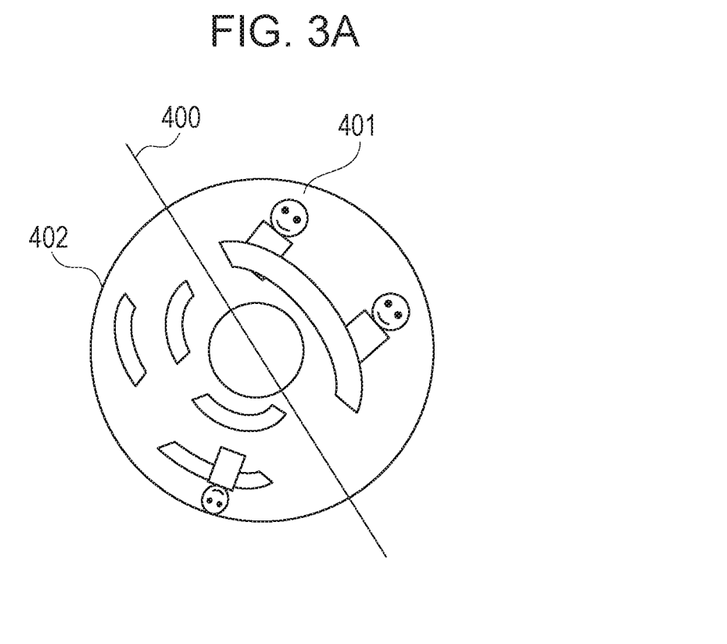
FIGS. 3A and 3B illustrate a relationship between an omnidirectional image and a two-screen panoramic image.
Figure 3B:
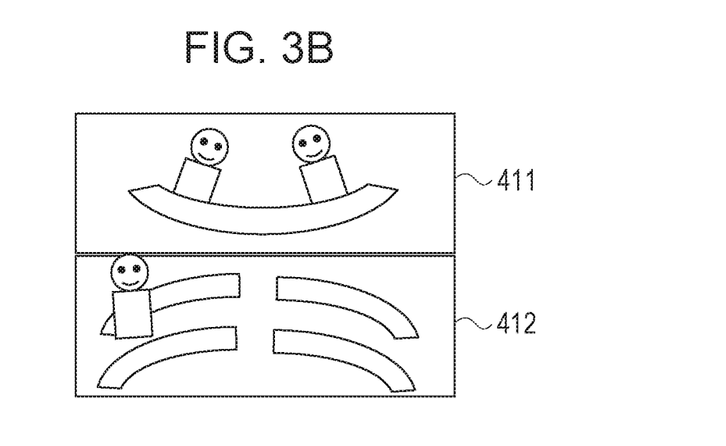

FIGS. 3A and 3B illustrate a relationship between the omnidirectional image (fisheye image) and a two-screen panoramic image.

FIG. 3A indicates a position where an image is divided out (cut out) from the omnidirectional image. In particular, FIG. 3A shows a division line 400 along which the omnidirectional image is divided into a 180-degree divided area (cutout area) 401 and a 180-degree divided area (cutout area) 402. It should be noted that the respective exemplary embodiments can be applied to not only the processing for dividing and cutting out the omnidirectional image but also to processing for simply cutting out a part of the omnidirectional image without dividing. In other words, it is not necessary that boundaries of the portions, which are cut out from the omnidirectional image, are bounded each other.

FIG. 3B illustrates a two-screen panoramic image created by vertically combining planar images 411 and 412 with each other. Planar images 411 and 412 are respectively are formed by performing a distortion correction on divided areas 401 and 402 for correcting the distortion caused by fisheye lens. In addition, when the divided area 402 is corrected into the planar image 412, an inversion operation is performed vertically and horizontally with respect to the divided area 402, and the planar image 412 is combined to the bottom side of planar image 411 to form a two-screen panoramic image.

Figure 4A:
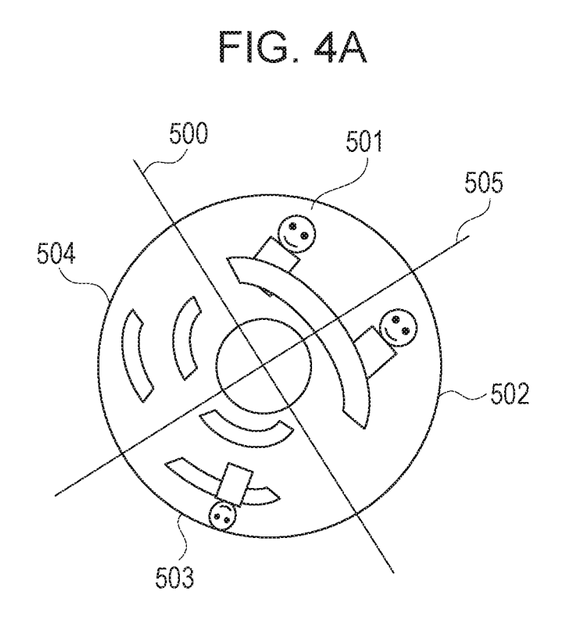
FIGS. 4A and 4B illustrate a relationship between the omnidirectional image and a four-screen panoramic image.
Figure 4B:
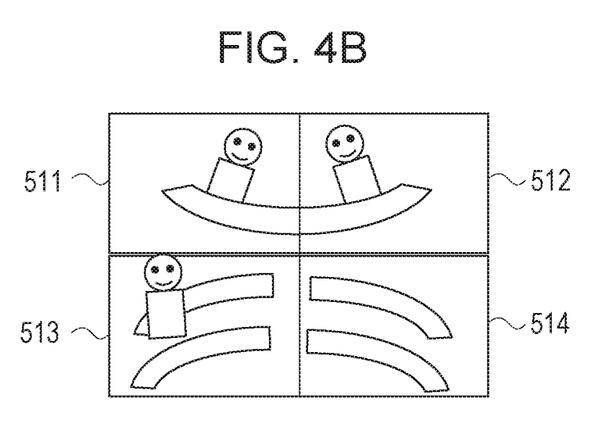

FIGS. 4A and 4B illustrate a relationship between the omnidirectional image and a four-screen panoramic image.

FIG. 4A indicates positions where images are divided out from the omnidirectional image. Specifically, FIG. 4A shows a dividing line 505 intersecting a division line 500 at a right angle. Dividing the omnidirectional image along both of these lines divides the omnidirectional image into 90-degree divided areas 501, 502, 503, and 504.

FIG. 4B illustrates a four-screen panoramic image created by vertically and horizontally combining together planar images 511, 512, 513, and 514. The planar images 511-514 are formed by performing distortion correction on the divided areas 501, 502, 503, and 504 for correcting the distortion caused by fisheye lens. In addition, for forming planar images 513 and 514, an inversion operation is performed vertically and horizontally with respect to each of the planar images 513 and 514. Once the planar images 511-514 are formed, the planar images 513 and 514 are respectively combined to the bottom side of planar images 511 and 512 to form the four-screen panoramic image.

Figure 5:
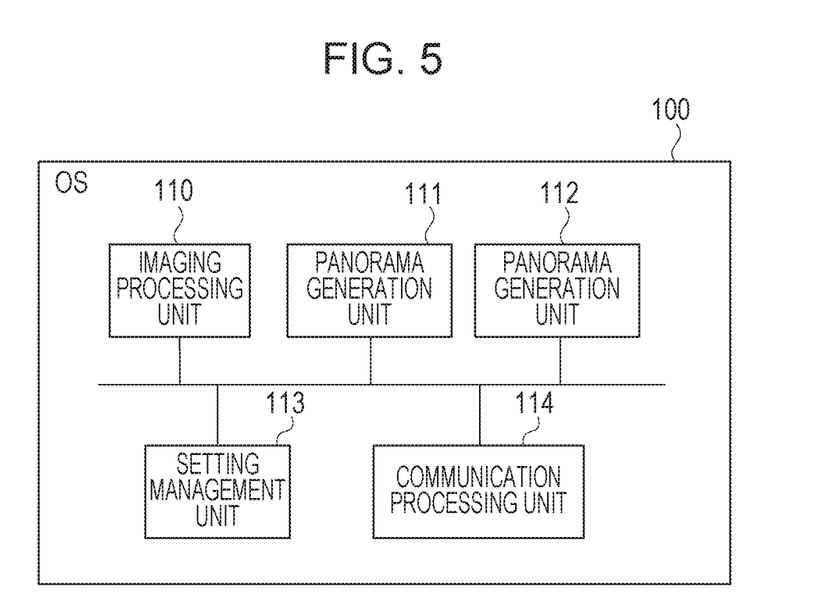
FIG. 5 illustrates an example of a software configuration of the camera server.

FIG. 5 illustrates an example of a software configuration of the camera server 200.

The camera server 200 includes an OS 100, an imaging processing unit 110, two panorama generation units 111 and 112, a setting management unit 113, and a communication processing unit 114. These units are preferably implemented in software.

The OS 100 controls the entirety of the camera server.

The imaging processing unit 110 generates omnidirectional image data based on data from the image capture I/F 330. The image capture I/F 330 receives data from the image sensor 370 on the basis of light which is incident via the fisheye lens.

The setting management unit 113 saves a setting value used for creating the panoramic image, such as division line information (end line information) indicating a division line from/along which a division of the omnidirectional image data is performed for creating the panoramic image. It will be appreciated that the division line will correspond to an end of the panoramic image.

The panorama generation unit 111 obtains the setting value (such as the division line (end line) saved by the setting management unit 113) for creating the panoramic image, and uses the setting value to generate the panoramic image from the omnidirectional image data (generated by the imaging processing unit 110).

The panorama generation unit 112 creates a panoramic image of a different type from that of the panoramic image created by the panorama generation unit 111. For example, the panorama generation unit 111 creates the two-screen panoramic image. Then, the panorama generation unit 112 creates the four-screen panoramic image. The panorama generation unit 111 and the panorama generation unit 112 may execute the processing for creating the panoramic images at the same time or they may separately execute the processing for creating the panoramic image.

The processing for generating the panoramic images by the panorama generation unit 111 and the panorama generation unit 112 is an example of control processing for generating the plurality of panoramic images in which the division lines are automatically matched (harmonized) with each other from the omnidirectional image on the basis of the setting value. This processing for generating the panoramic images is explained later referring to FIG. 6.

The communication processing unit 114 controls the network I/F 360 and performs a communication with an external apparatus via the network 230. More specifically, the communication processing unit 114 distributes the omnidirectional image generated by the imaging processing unit 110 or the panoramic image generated by the panorama generation unit 111 or 112 in accordance with a request of the client 220. The communication processing unit 114 also replies by saving and referring to the setting value via the setting management unit 113 in accordance with a request of the client 220.

The camera server 200 may include the plurality of communication processing units 114 as the software configuration or may also include a configuration in which an interface other than the communication processing unit 114 is accepted.

Mutual cooperation between the respective software configurations use functions provided by the OS 100 as appropriate.

Figure 6:
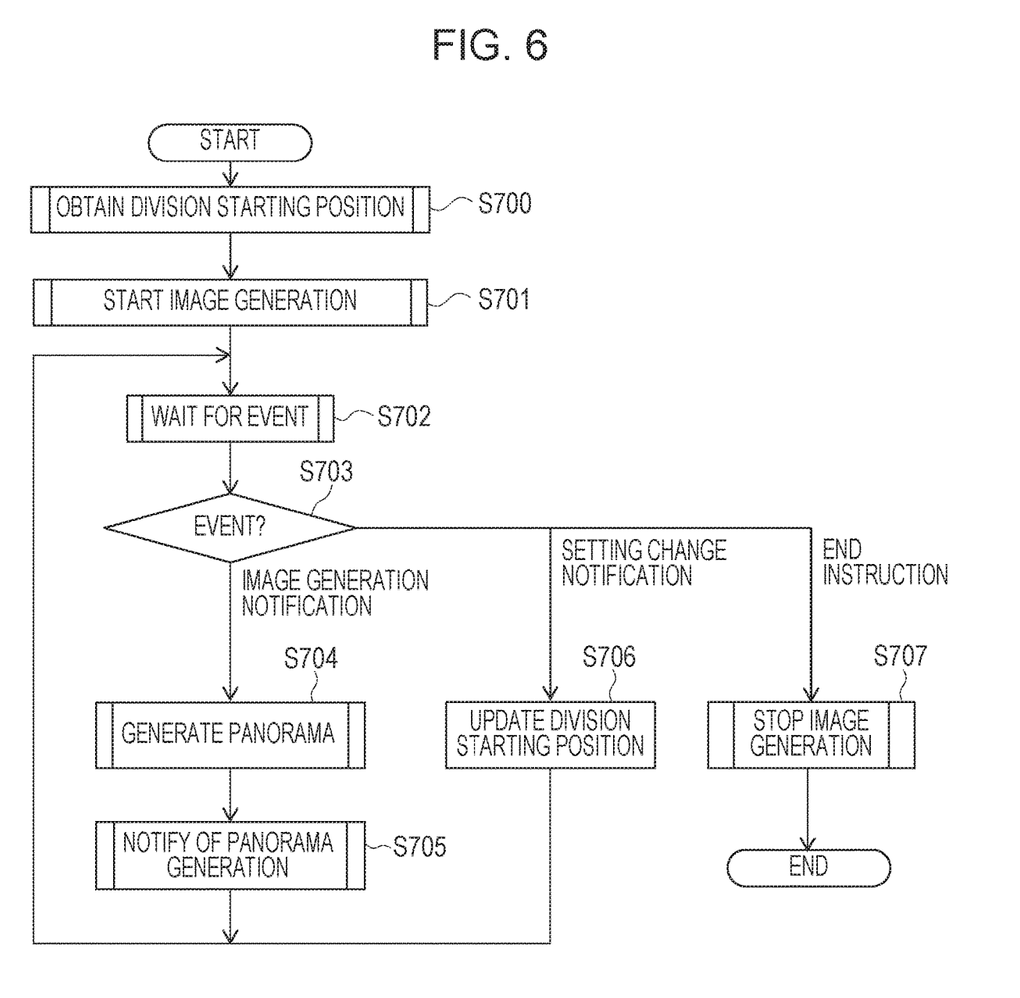
FIG. 6 is a flow chart illustrating an example of information processing of a panorama generation unit.

FIG. 6 is a flow chart illustrating an example of information processing of the panorama generation units 111 and 112.

According to the present exemplary embodiment, unless specifically mentioned, a case where the panorama generation unit 111 generates the two-screen panoramic image will be described.

The panorama generation unit 111 is activated when the panoramic image becomes needed, for example, when the client 220 requests for the panoramic image.

In S700, when the panorama generation unit 111 is activated, the panorama generation unit 111 obtains the setting value for generating the panoramic image from the setting management unit 113. The setting value includes the division line of the omnidirectional image. The processing in S700 is an example of processing for obtaining a setting value with which it is possible to identify an end line corresponding to the end in the panoramic image. It will be appreciated that the panoramic image, of course, corresponds to at least a part of the fisheye image and that it also corresponds to an image on which the distortion correction processing for correcting the distortion caused by fisheye lens has been performed.

The obtained division line may also include at least a central viewing angle of the omnidirectional image, and/or various other information for indicating the divided areas such as: tilt information indicating a distance from the center of the omnidirectional image; and zoom information indicating a size of the divided area. In this sense, it will be understood that the division line may include data other than line data. According to the respective exemplary embodiments, a direction in which a radius of a circular part in the omnidirectional image (e.g. the radius of the omnidirectional image) is rotated around the center of the circle is set as a pan direction. On the other hand, a direction along the radius is set as a tilt direction.

The setting value used for generating the panoramic image may also include arrangement information of each of the divided areas. When the setting value includes the arrangement information, for example, the planar images 511 and 512 on the four-screen panorama of FIG. 4B and the planar image 411 on the two-screen panorama of FIG. 3B can be arranged at the same positions on the respective panoramic images. Similarly, the planar images 513 and 514 on the four-screen panorama of FIG. 4B and the planar image 412 on the two-screen panorama of FIG. 3B can be arranged at the same positions on the respective panoramic images.

In S701, the panorama generation unit 111 instructs the imaging processing unit 110 to start the generation of the omnidirectional image.

In S702, the panorama generation unit 111 waits until any event occurs. The panorama generation unit 111 waits for an event such as an image generation notification from the imaging processing unit 110, a setting change notification from the setting management unit 113 or the communication processing unit 114, or an end instruction from the communication processing unit 114. An image generation notification is a command which instructs to generate a panoramic image. A setting change notification is a command which instructs to change a division line. For examples, a division (or ending) line is a division line 500, 500, or 505. An end instruction is a command which instructs to end generating panoramic images.

When the event occurs, in S703, the panorama generation unit 111 and 112 check a type of the event and executes corresponding processing. When the panorama generation unit 111 and 112 receive an image generation notification event from the imaging processing unit 110, the flow proceeds to S704. When the panorama generation unit 111 receives a setting change notification event from the setting management unit 113, the flow proceeds to S706. When the panorama generation unit 111 and 112 receive an end instruction event from the communication processing unit 114, the flow proceeds to S707.

In S704, the panorama generation unit 111 and 112 generate the panoramic image on the basis of the setting value from the omnidirectional image information included in the notification event. In S704, the panorama generation unit 112 generates the panoramic images which are divided at a division line 500. This division line 500 is a same position as division line 400 of the panoramic image generated by the panorama generation unit 111.

In S705, the panorama generation unit 111 and 112 notify the communication processing unit 114 of the generated panoramic image. Thereafter, the panorama generation unit 111 and 112 return to a waiting state for an event in S702 again.

In S706, the panorama generation unit 111 and 112 again obtain the setting value used for generating the panoramic image including the division line included in the notification event so that the setting can be used for the next panorama generation. For example, the panorama generation unit 111 and 112 update the setting value obtained in S700 by the setting value used for generating the panoramic image including the division line included in the notification event.

In S706, the updated setting value for panorama generation unit 112 indicates a division line 500 which is a same position as division line 400 indicated by the updated setting value for the panorama generation unit 111. For example, panorama generation unit 112 updates the setting value for the panorama generation unit 112 automatically which indicates a same position as division line to be changed by the setting change notification, even if only the setting change notification for the panorama generation unit 111 is received. Further, sometimes, a setting change notification is received when the panorama generation unit 111 and 112 are generating panoramic images, then, respective division lines are changed immediately to division lines which are indicated by the setting change notification. In this manner, end lines of the two-screen panoramic image are keeping same as end lines of the four-screen panoramic image automatically, and it is possible to specify the divided areas on the plurality of panoramic images with keeping harmonization of end lines.

Thereafter, the panorama generation unit 111 and 112 return to the waiting state for an event in S702 again.

In S707, when the panorama generation unit 111 and 112 receive the end instruction event from the communication processing unit 114, the panorama generation unit 111 instructs the imaging processing unit 110 to stop the generation of the omnidirectional image. Then, the panorama generation unit 111 and 112 end the processing of the panorama generation unit 111 and 112.

According to the present exemplary embodiment, the setting change notification event from the setting management unit 113 is such an event that the setting value is saved on a permanent basis, and all the panorama generation units are notified of the event in a case where the setting value is maintained and even when the apparatus is rebooted. With this configuration, it is possible to change the division lines of the panorama generation units 111 and 112 at the same time.

In addition, the setting change notification may be transmitted from the communication processing unit 114. The setting change notification event from the communication processing unit 114 means that the setting value is temporarily changed, and the changed contents are discarded when the apparatus is rebooted. The communication processing unit 114 may also transmit the setting change notification event to only a specific panorama generation unit such as, for example, the panorama generation units 111 and 112.

With this configuration, the following usage can be appropriately adopted. In a case where the division lines of all the panoramic images are changed on a permanent basis such as a case where the client installs the camera, the setting change notification event is transmitted from the setting management unit 113. In a case where the division line of the currently viewed panoramic image is changed to temporarily make it easier for the client to view the object, the setting change notification event is transmitted from the communication processing unit 114. The setting management unit 113 is an example of a first unit. The communication processing unit 114 is an example of a second unit.

Second Exemplary Embodiment

Figure 7A:
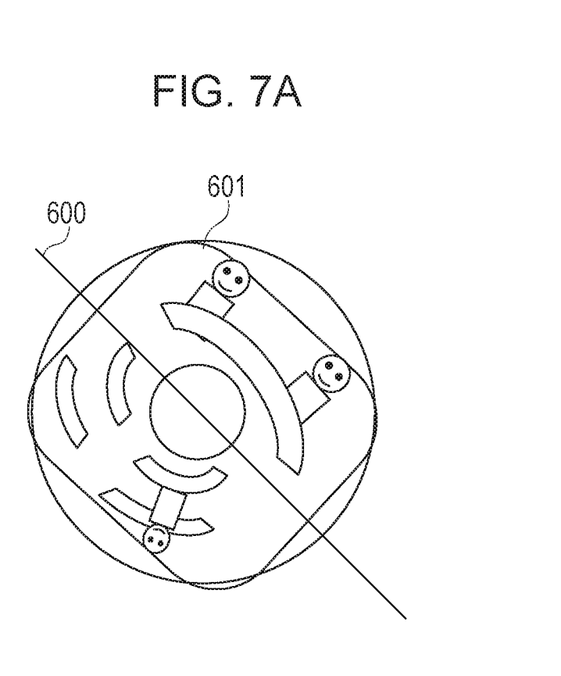
FIGS. 7A and 7B illustrate a relationship between the omnidirectional image and a one-screen panoramic image.
Figure 7B:
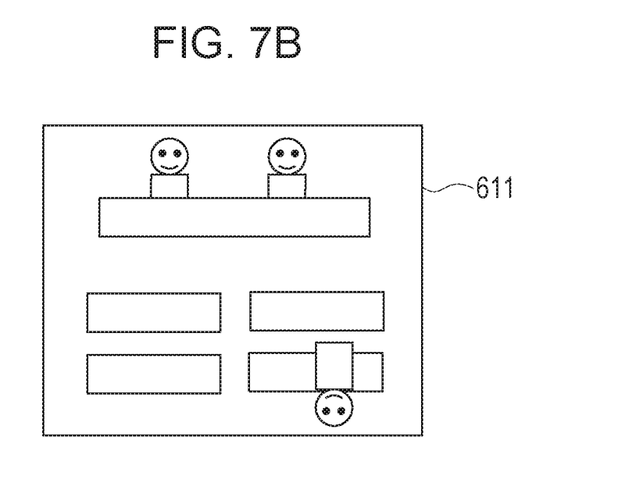

FIGS. 7A and 7B illustrate a relationship between the omnidirectional image and a one-screen panoramic image.

In FIG. 7A, horizontal line 600 indicates a horizontal direction on the omnidirectional image, and divided area 601 illustrates an area corresponding to a planar image 611 in a one-screen panorama.

FIG. 7B illustrates the planar image 611. The planar image 611 is obtained by performing distortion correction on the divided area 601.

The software configuration diagram of the camera server 200 according to the present exemplary embodiment is basically the same as FIG. 5 according to the first exemplary embodiment. However, differences of the present exemplary embodiment reside in that the panoramic image generated by the panorama generation unit 111 is the one-screen panoramic image illustrated in FIG. 7B, and the setting value of the division line saved by the setting management unit 113 is the position of the horizontal line 600 illustrated in FIG. 7A.

When the position of the horizontal line 600 is saved as the division line, the division lines of the two-screen panorama or the four-screen panorama can be changed in a harmonized manner in a case where the horizontal line of the one-screen panorama is changed. That is, when the horizontal line of the one-screen panorama is changed, a corresponding change can also be made to the division staring lines of the two-screen panorama and/or the four-screen panorama. In this way, the division lines of different panoramas are automatically matched such that any change in one division line results in a corresponding change in the division lines of the one or more other panoramas.

In this manner, the horizontal line of the one-screen panoramic image are keeping same as end lines of the two-screen panorama and/or the four-screen panorama automatically, it is possible to specify the divided areas on the plurality of panoramic images with keeping harmonization of end lines.

Third Exemplary Embodiment

Figure 8:
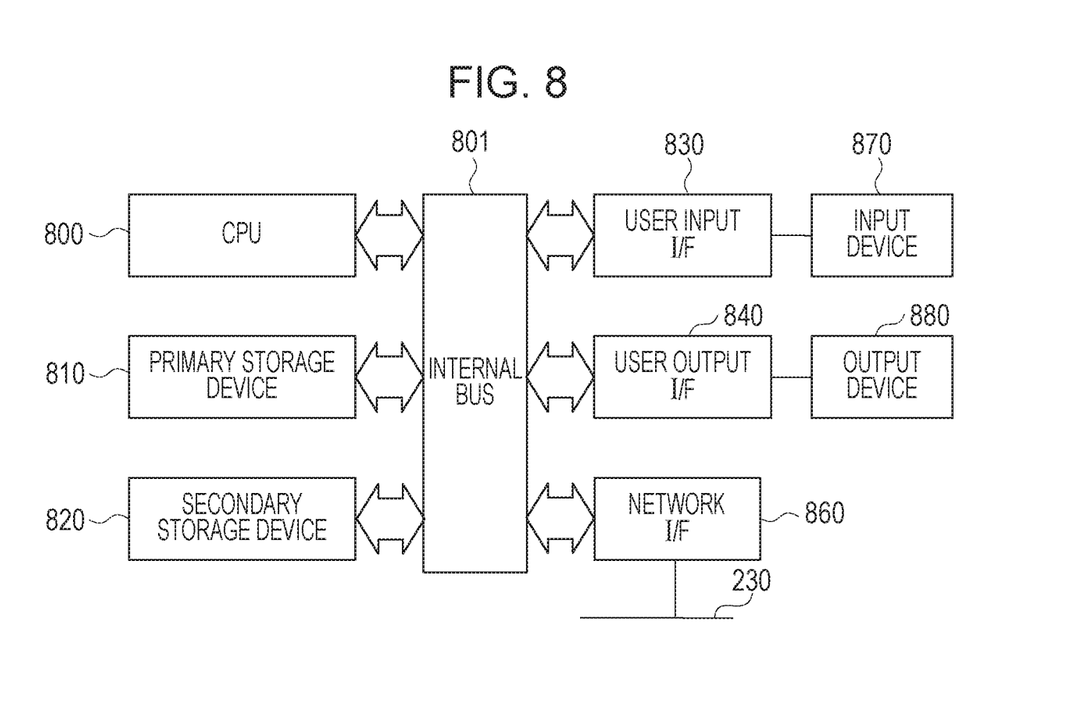
FIG. 8 illustrates an example of a hardware configuration of a client.

FIG. 8 illustrates an example of a hardware configuration of the client 220.

The client 220 includes a CPU 800, a primary storage device 810, a secondary storage device 820, a user input I/F 830, a user output I/F 840, and a network I/F 860 as the hardware configuration. The respective hardware configurations are connected to one another via an internal bus 801.

The primary storage device 810 is a writable high-speed storage device represented as a RAM. An OS, various programs, and various data are loaded onto the primary storage device 810. The primary storage device 810 can also be used as a work area for the OS and the various programs.

The secondary storage device 820 is a non-volatile storage device represented by a floppy disc drive (FDD), a HDD, a flash memory, a CD-ROM drive, and the like. The secondary storage device 820 is used as a permanent storage area for the OS, the various programs, and the various data and is also used as a storage area for various short-term data.

An input device 870 represented by a key board, a mouse, or the like is connected to the user input I/F 830 and governs the input from the user.

An output device 880 represented by a display or the like is connected to the user output I/F 840 and governs the output to the user.

The network I/F 860 is an I/F for establishing a connection to the network 230 and plays a role for performing a communication with the camera server 200 or the like via a communication medium such as Ethernet.

Figure 9:
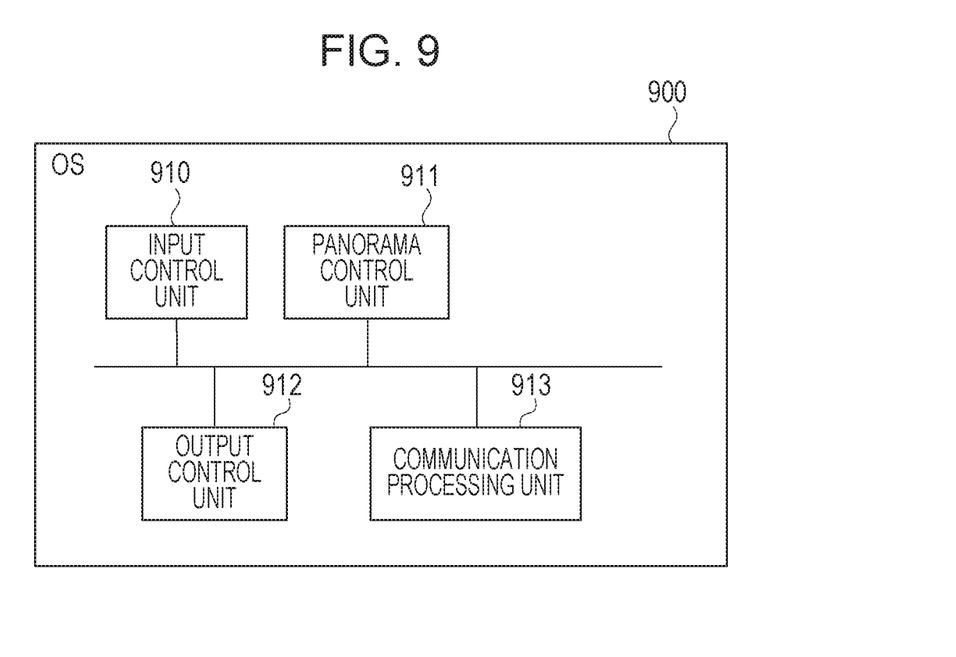
FIG. 9 illustrates an example of a software configuration of the client.
Figure 11:
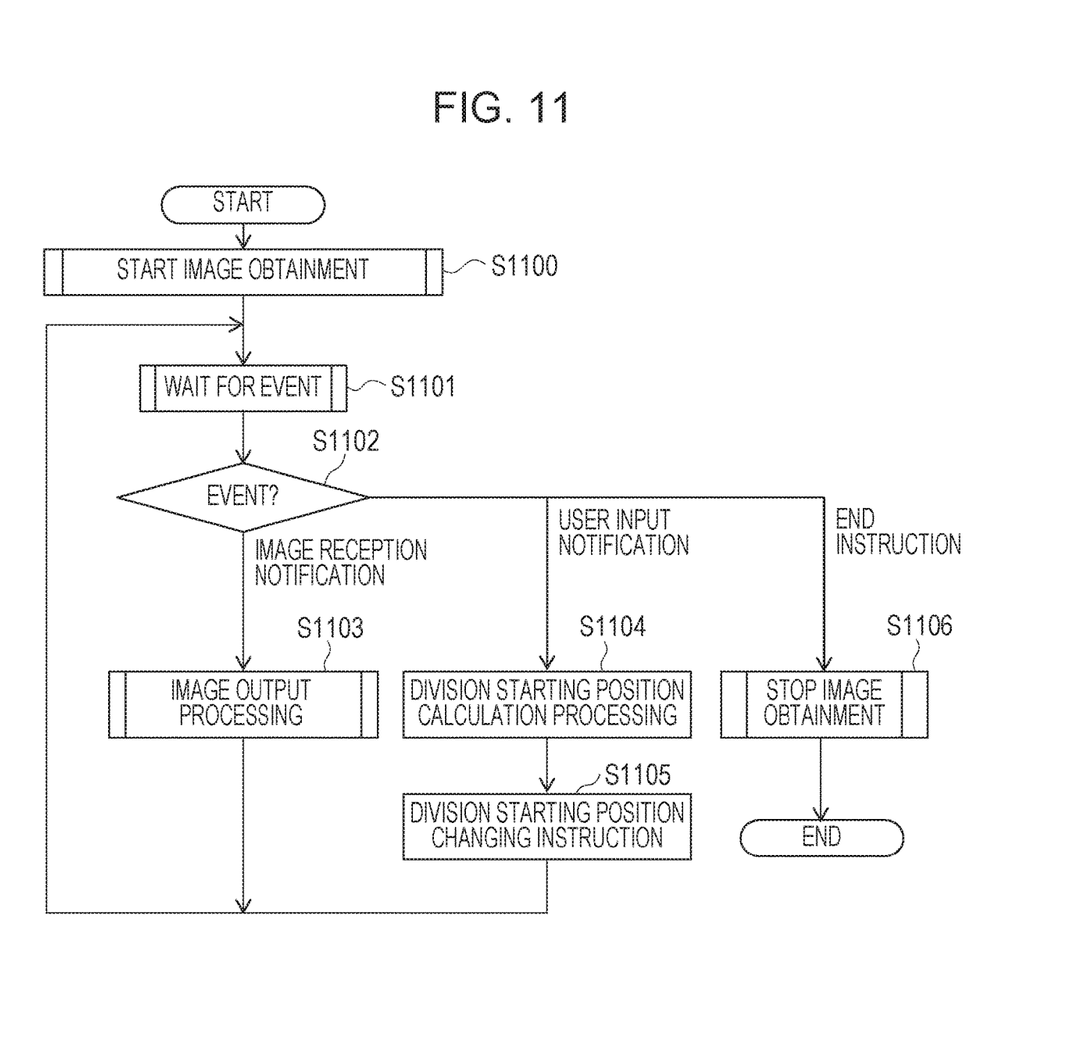
FIG. 11 is a flow chart illustrating an example of information processing of a panorama control unit.

When the CPU 800 executes processing on the basis of the OS or the program stored in the secondary storage device 320, the software configuration of FIG. 9 and the process flow of FIG. 11 are implemented. FIG. 9 and FIG. 11 will be described in detail below.

FIG. 9 illustrates an example of a software configuration of the client 220.

The client 220 includes an OS 900, an input control unit 910, a panorama control unit 911, an output control unit 912, and a communication processing unit 913 as the software configuration.

The OS 900 controls the entirety of the client.

The panorama control unit 911 obtains the omnidirectional image or the panoramic image from the camera server 200 via the communication processing unit 913 and outputs the obtained image via the output control unit 912. When the division line of the panoramic image is changed at the input control unit 910, the panorama control unit 911 saves the changed division line in the camera server via the communication processing unit 913.

The input control unit 910 transmits information indicating that the user has operated the input device 870 such as the key board or the mouse for controlling the panorama control unit 911. According to the present exemplary embodiment, the case has been described where the user directly operates the key board, the mouse, or the like, but the exemplary embodiment can also be realized by an operation via a network or an automatic execution program.

The output control unit 912 displays the omnidirectional image, the panoramic image, or information such as an area for the user input on an output device 880 such as a display in accordance with an instruction from the panorama control unit 911.

The communication processing unit 913 controls the network I/F 860 to (i) receive the omnidirectional image or the panoramic image from the camera server 200 via the network 230, or (ii) transmit or receive the division line of the panoramic image.

Mutual cooperation between the respective software configurations use functions provided by the OS 900 as appropriate.

FIGS. 10A to 10D illustrate an example of a panorama division line specifying screen.

FIGS. 10A to 10D illustrate a method for the panorama control unit 911 to display the image or the division area via the output control unit 912, and for the input control unit 910 to perform the change.

Figure 10A:
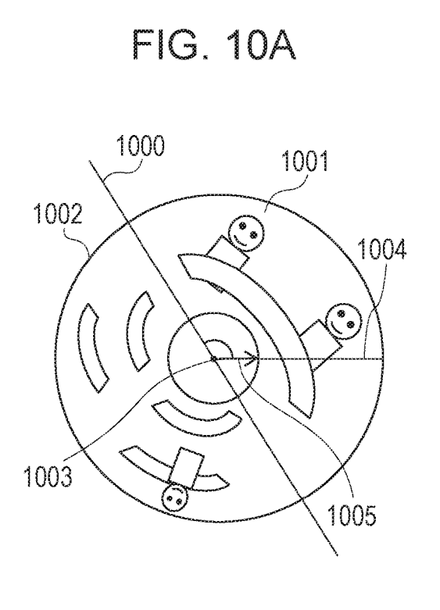
FIGS. 10A to 10D illustrate an example of a panorama division line specifying screen.

FIG. 10A illustrates an example in which the omnidirectional image is displayed and divided into two areas by a dividing line and a center distance.

The angle between a horizontal line 1004 from a center 1003 of the omnidirectional image and a division line 1000 is set as a pan angle. The line 1005 from the center 1003 to an inner circumference of the divided area is set as a tilt angle. The input control unit 910 can be used to change these angles. As a result, the omnidirectional image is divided into divided areas 1001 and 1002. The input control unit 910 may also be used to change the division line. For example, a click or a drag-and-drop may be performed on the omnidirectional image (on the fisheye image) using the input device 870 (e.g. mouse) to define the division line 1000.

In FIG. 10A, the pan angle and the tilt angle are used, but the specification may be performed by using only the pan angle.

Figure 10B:
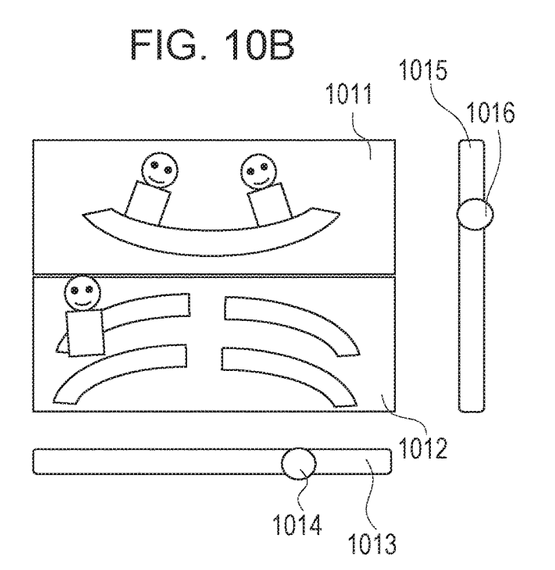

FIG. 10B illustrates an example in which planar images 1011 and 1012 of the two-screen panorama are displayed. In this example, the division line is specified by using the pan and tilt sliders.

The input control unit 910 displays a changeable area for the pan angle on a pan slider 1013 and displays a changeable current pan angle as a point 1014. The input control unit 910 also displays a changeable area for the tilt angle on a tilt slider 1015 and displays a changeable current tilt angle as a point 1016. The input control unit 910 may also change the division line on the basis of a specification of the point 1014 by the pan slider 1013 and a specification of the point 1016 by the tilt slider 1015.

In addition, the input control unit 910 may change the pan angle and the tilt angle on the basis of the information of the click or the drag-and-drop using the input device 870 such as the mouse performed on the two-screen panorama. The tilt angle can be represented by the line from the center on the omnidirectional image.

Figure 10C:
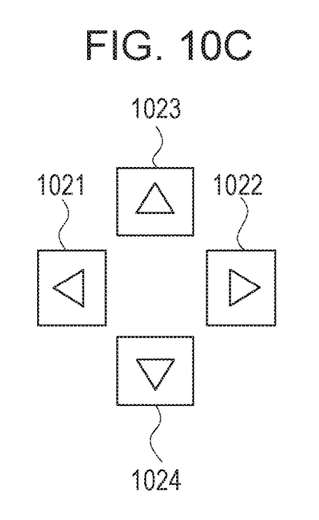

FIG. 10C illustrates an example in which the division line is specified by pan and tilt movement buttons.

In a case where a button 1021, 1022, 1023, or 1024 for changing the pan angle and the tilt angle is selected by using the input device 870 such as the mouse, the input control unit 910 can move the division line while the button is selected or move the division line by a certain amount each time the selection is performed. The buttons 1021 and 1022 mean changing of the pan angle, and the buttons 1023 and 1024 mean changing of the tilt angle. The input control unit 910 may also change the division line on the basis of the specification based on the buttons 1021 and 1022 and the specification based on the buttons 1023 and 1024.

Figure 10D:
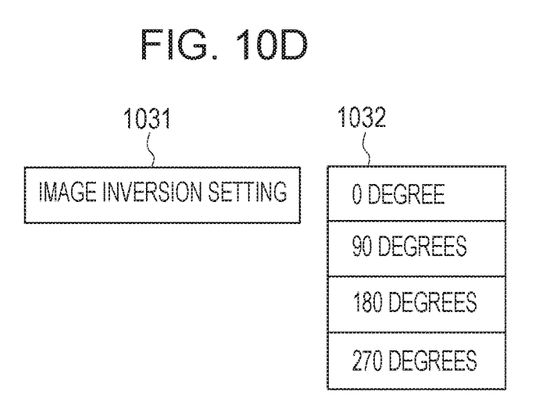

FIG. 10D illustrates an example in which the division line is specified by a setting item of the image sensor.

For example, the input control unit 910 selects the division line on the basis of information of 0 degree/90 degrees/180 degrees/270 degrees selected from options 1032 of an image inversion setting 1031 by using the input device 870 such as the mouse. The image inversion setting is an example of a rotation setting of the image. The input control unit 910 may also change the division line on the basis of the image inversion setting 1031 and the selection from the options 1032.

FIG. 11 is a flow chart illustrating an example of information processing of the panorama control unit 911 on the client 220.

The panorama control unit 911 is activated by an instruction from the user or the like when the panoramic image is to be displayed.

In S1100, the panorama control unit 911 instructs the communication processing unit 913 to start image obtainment from the camera server 200. The image to be obtained is not limited to the panoramic image, and the omnidirectional image may also be obtained.

In S1101, the panorama control unit 911 waits for an occurrence of any event. The panorama control unit 911 waits for an event such as an image reception notification from the communication processing unit 913, a user input notification indicating that the user has changed the division line, or an event of an end instruction from the user or an end instruction based on a communication abnormality.

When the event occurs, in S1102, the panorama control unit 911 checks a type of the event and executes corresponding processing. When the panorama control unit 911 receives an image reception notification event from the communication processing unit 913, the flow proceeds to S1103. When the user input notification event is received from the user, the flow proceeds to S1104. When the end instruction event from the user or the end instruction event based on the communication abnormality is received, the flow proceeds to S1106.

In S1103, the panorama control unit 911 displays the received image on the output device 880 such as the display via the output control unit 912. Thereafter, the panorama control unit 911 returns to the event waiting state in S1101 again. According to the present exemplary embodiment, it is supposed that the panorama control unit 911 receives the images in succession, but, if not so, the panorama control unit 911 may also request the image obtainment start again when necessary.

In S1104, the panorama control unit 911 calculates the division line after the change on the basis of the user operation.

In S1105, the panorama control unit 911 instructs the camera server 200 to change the division line via the communication processing unit 913. Thereafter, the panorama control unit 911 returns to the event waiting state in S1101 again.

In S1106, the panorama control unit 911 stops the processing for obtaining the images in succession from the camera server 200. Then, the panorama control unit 911 ends the processing of the panorama control unit 911.

In this manner, end lines of the two-screen panoramic image are keeping same as end lines of the four-screen panoramic image automatically, and it is possible to specify the divided areas on the plurality of panoramic images with keeping harmonization of end lines. This harmonization is carried out on the camera server 200 side in a still easier mode for the user, and the division line is specified by the various methods on the client 220 side while the omnidirectional image or the panoramic image is displayed.

Other Exemplary Embodiments

The exemplary embodiments of the present invention can also be realized by the following processing. That is, a program that provides one or more functions of the above-described exemplary embodiments is supplied to a system or an apparatus via a network or a storage medium. One or more processors in a computer in the system or the apparatus read out and execute the program. In addition, the exemplary embodiments of the present invention can also be implemented in a circuit that provides one or more functions (for example, an application specific integrated circuit (ASIC)).

The example of the exemplary embodiments of the present invention has been described above in detail, but the present invention is not limited to the above-described specific exemplary embodiments.

For example, a part or all of the software configurations of the camera server 200 may be implemented in the camera server 200 as the hardware configurations. In addition, a part or all of the software configurations of the client 220 may be implemented in the camera server 200 as the hardware configurations.

Moreover, a plurality of CPUs may exist as the hardware configurations of the camera server 200 or the client 220, and the plurality of CPUs may execute the processing on the basis of the program.

Furthermore, a graphics processing unit (GPU) may be used as the hardware configuration of the camera server 200 or the client 220 instead of the CPU.

According to the above-described respective exemplary embodiments, the end lines of each panoramic image are keeping same as end lines of the other panoramic images automatically, and it is possible to specify the divided areas on the plurality of panoramic images with keeping harmonization of end lines.

According to the above-described respective exemplary embodiments, it is possible to synchronize the areas between the plurality of panoramic images generated from the fisheye image with each other.

Embodiment(s) of the present invention can also be realized by a computer of a system or apparatus that reads out and executes computer executable instructions (e.g. one or more programs) recorded on a storage medium (which may also be referred to more fully as a 'non-transitory computer-readable storage medium') to perform the functions of one or more of the above-described embodiment(s) and/or that includes one or more circuits (e.g. application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g. central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-166983 filed Aug. 31, 2017, which is hereby incorporated by reference herein in its entirety.

What is claimed is:

1. An image processing apparatus comprising a computer executing instructions that, when executed by the computer, cause the computer to function as:
an obtaining unit configured to obtain a setting for identifying a first division line and a second division line for an image captured through a fisheye lens, the first and second division lines corresponding to edges of a plurality of distortion corrected images generated by performing distortion correction processing on a corresponding portion of the image; and
a generating unit configured to generate a first set of the plurality of distortion corrected images using a first group having the first division line and a second set of the plurality of distortion corrected images using a second group, different from the first group, having the first and second division lines,
wherein a number of divisions of the image in the first set is different from a number of divisions of the image in the second set,
wherein the first set includes at least a first distortion corrected image, and the second set includes at least a second distortion corrected image and a third distortion corrected image,
wherein the generating unit generates the first set and the second set such that one of the edges of the first distortion corrected image is matched with one of the edges of the second distortion corrected image, and an other one of the edges of the first distortion corrected image is matched with one of the edges of the third distortion corrected image, based on the setting.

2. The image processing apparatus according to claim 1, wherein the setting includes at least pan information indicating an angle from a center of the image captured through the fisheye lens.

3. The image processing apparatus according to claim 1, wherein the obtaining unit obtains the setting included in a generation notification of the plurality of distortion corrected images.

4. The image processing apparatus according to claim 1, wherein, in a case where a change notification of the setting is received, the generating unit updates the setting obtained by the obtaining unit based on a setting included in the change notification and generates the first set of the distortion corrected images and the second set of the distortion corrected images.

5. The image processing apparatus according to claim 1, wherein the instructions further cause the computer to function as a distribution unit configured to distribute the first set and the second set to an external apparatus.

6. A non-transitory recording medium that stores a program for causing a computer to function as respective units of the image processing apparatus according to claim 1.

7. The image processing apparatus according to claim 1, wherein the one of the edges of the first distortion corrected image is a left side edge of the first distortion corrected image, and the other one of the edges of the first distortion corrected image is a right side edge of the first distortion corrected image.

8. An information processing method executed by an image processing apparatus, the information processing method comprising:
   obtaining a setting for identifying a first division line and a second division line for an image captured through a fisheye lens, the first and second division lines corresponding to edges of a plurality of distortion corrected images generated by performing distortion correction processing on a corresponding portion of the image; and
   generating a first set of the plurality of distortion corrected images using a first group having the first division line and a second set of the plurality of distortion corrected images using a second group, different from the first group, having the first and second division lines, wherein a number of divisions of the image in the first set is different from a number of divisions of the image in the second set, wherein the first set includes at least a first distortion corrected image, and the second set includes at least a second distortion corrected image and a third distortion corrected image, wherein the first set and the second set are generated such that one of the edges of the first distortion corrected image is matched with one of the edges of the second distortion corrected image, and an other one of the edges of the first distortion corrected image is matched with one of the edges of the third distortion corrected image, based on the setting.

* * * * *